Figure 1:
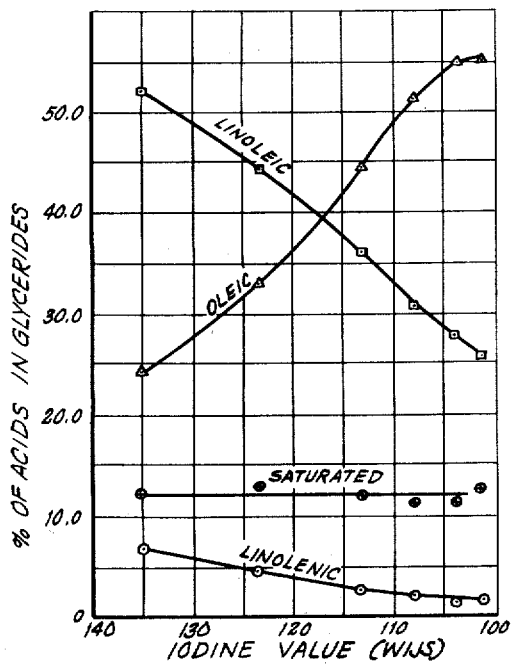

Nov. 26, 1957  C. M. GOODING  2,814,633
NOVEL HYDROGENATION PROCESS AND PRODUCTS THEREOF
Filed April 5, 1954

SELECTIVE
HYDROGENATION
OF SOYA OIL
PRESSURE : 25 PSIG
TEMPERATURE : 350° F.

NON-SELECTIVE
HYDROGENATION
OF SOYA OIL
PRESSURE : 25 PSIG
TEMPERATURE : 350° F.

INVENTOR.
Chester M. Gooding
BY
ATTORNEYS

United States Patent Office 2,814,633
Patented Nov. 26, 1957

2,814,633

NOVEL HYDROGENATION PROCESS AND PRODUCTS THEREOF

Chester M. Gooding, Staten Island, N. Y., assignor to The Best Foods, Inc., New York, N. Y., a corporation of New Jersey Application April 5, 1954, Serial No. 420,839

5 Claims. (Cl. 260—409)

The present invention relates to a novel process for hydrogenating vegetable oils and to the novel hydrogenated oils obtained thereby, as well as to products containing these hydrogenated oils or fats.

In the hydrogenation of vegetable or glyceridic oils for the manufacture of semi-solid food products such as margarine, shortening and vegetable confectionary products, it is customary to adopt a type of hydrogenation which will yield a hydrogenated oil having physical characteristics suited to the particular food product. For example, an oil hydrogenated for use as a shortening will not, in general, be satisfactory as a fat in the manufacture of margarine. Likewise, an oil hydrogenated in a manner which results in a food fat desirable for use in margarine is entirely unsuited for use as a shortening.

In general, the use of a relatively small concentration of a very active hydrogenation catalyst at a relatively low pressure and high temperature results in a selective-type hydrogenation, yielding a fat of low residual polyunsaturated ester content, low saturated ester content and low melting point in relation to setting point. (See Industrial Oil and Fat Products, 2nd edition, 1951, by A. E. Bailey, pages 681–2.) Such a fat will provide a margarine which melts quickly in the mouth and yet one which has excellent resistance to softening on the table, especially at summer temperatures.

In contrast to the hydrogenation technique employed to produce a margarine fat, to prepare a fat for shortening use, one employs a less active hydrogenation catalyst at lower temperatures and higher pressure. This results in a less selective hydrogenation which means that relatively more saturated esters are formed than in margarine-fat hydrogenation. Also, more polyunsaturated esters remain unhydrogenated in a shortening fat hydrogenated under non-selective conditions. Such a fat possesses a melting point higher in relation to its setting point than does a margarine fat. Anyone skilled in the art has observed the foregoing differences if he has had occasion to compare the melting points of two such fats at any given setting point.

In recent years, a demand has arisen for a margarine-fat which will be less brittle at low temperatures than are the margarine fats which had heretofore enjoyed preference. Brittleness in a margarine is evidenced by a poor degree of spreadability on fresh bread when employed immediately after removal of the margarine from the refrigerator. The margarine crumbles under pressure of a knife and the excessive pressure required to smooth the margarine on the fresh bread results in a tearing apart of the sliced bread. This effect has no doubt been accentuated by the lower prevailing temperatures in home refrigerators since the wide-spread use of the ordinary one-compartment refrigerator containing facilities both for storage of frozen foods and ordinary non-frozen foods. Brittleness is very likely an evidence of the presence of fatty acid esters which are geometric and positional isomers of the naturally occurring and corresponding unsaturated esters.

Attempts to satisfy the demand for a cold-spreadable and plastic margarine have thus far utilized only one or the other of the classical types of hydrogenation, namely, either selective or non-selective hydrogenation, but not both. A degree of plasticity can be achieved by blending the two oils hydrogenated to widely different degrees. One may be hydrogenated to so great a degree that it, alone, would be entirely too hard for use as a margarine fat. This excessive hardness is off-set by blending such a fat with another fat hydrogenated to a considerably lesser degree and only to a degree which, if used alone, it would be much too soft for margarine use. Indeed, the soft fraction of the blend need not be hydrogenated at all. The whole object of this prior art practice is to provide a relatively hard fraction and a much softer fraction which when blended in proper proportions possesses an approximate similarity to the unblended margarine fats of the prior art in regard to plasticity of the margarine at room temperatures but one which, due to its higher content of esters which are liquid at refrigerator temperatures, will be more spreadable when freshly removed from the refrigerator.

The same objects may be gained by blending of fats hydrogenated under non-selective conditions to two or more varying degrees. Judicious choice of melting points of the separate fractions can result in a margarine having acceptable body of the margarine at 70° F. or 75° F.

None of these prior art methods of producing a plastic margarine has been completely successful. Usually, plasticity at low temperatures has been achieved by sacrificing body at summer temperatures; consequently, the margarines are objectionably soft and oily at summer temperatures and if not properly refrigerated, the margarine will melt, producing an oil-stained carton. If a melting point of the blend has been chosen to specifically prevent oiliness and excessive softening at higher temperatures, in which case plasticity at low temperature is impaired, an objectionable slow-melting or fluffiness in the mouth is encountered when eaten.

One object of the present invention is to provide a novel method of hydrogenation for producing a margarine fat which will possess an extended range of plasticity in the lower temperatures encountered in modern home refrigerators (38°–42° F.) and one which will have desirable body characteristics at normal room temperatures and one which will not result in oil-stained cartons in the course of ordinary distribution and merchandising practices.

Another object of the present invention is to provide a margarine fat which has a desirable degree of plasticity at normal refrigeration temperatures and yet desirable body characteristics at normal room temperatures.

Other objects and advantages of the invention will be described and will be apparent to those skilled in the art from the description which follows and from the appended drawings.

In the appended drawings Figure 1 is a series of graphs showing certain of the characteristics of soya oil at various stages of hydrogenation under selective conditions.

Figure 2:
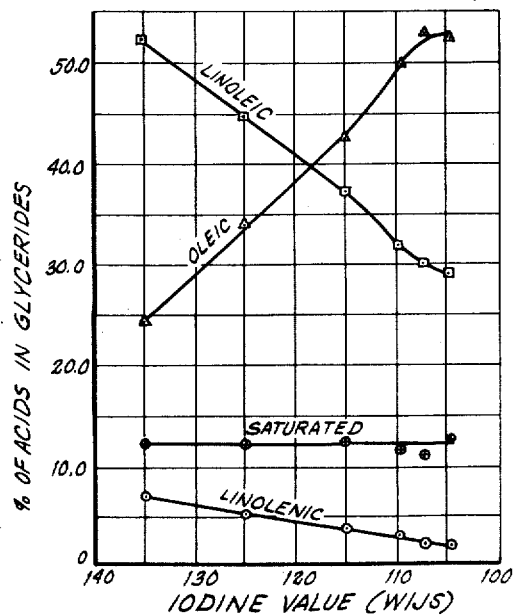

Figure 2 of the appended drawings is similar to Figure 1 except that the hydrogenation conditions employed are non-selective in character.

This invention is particularly well suited to the hydrogenation of oils which are of the class of non-conjugated oils, such as soya, corn, sunflower, safflower and linseed oils, which possess unconjugated fatty acid esters. This class of oils possesses a relatively high degree of unsaturation due to the presence of polyunsaturated esters, such as esters of linoleic acid and linolenic acids. Oils of the type of tung oil which possess conjugated unsaturated fatty acid esters are specifically excluded from consideration since this invention is not applicable to such oils.

As stated earlier, all attempts to prepare a margarine which will be plastic at low temperatures have utilized either, but not both, selective or non-selective conditions to varying degrees in the preparation of separate fat components which are suitably blended to achieve the desired result. In contrast, the process of the present invention utilizes, first non-selective hydrogenation and then selective hydrogenation on a single oil or oil mixture. The two types of hydrogenation may be performed separately whereby a stock of oil produced from a series of batch-wise operations may be accumulated which has been partially hydrogenated under non-selective conditions. This combined stock may then be further hydrogenated under selective conditions. Practicing of the invention in this manner may have some advantage in case the separate hydrogenations are not rigidly controlled in regard to the degree of hydrogenation. The accumulated stock of hydrogenated oil can thus be made more uniform. However, in modern installations which are adequately instrumented, there is no difficulty experienced in performing the two types of hydrogenation in a smoothly consecutive, continuous manner without an intermediate break in operations.

The present invention is made possible by my discovery that during the initial stage of hydrogenation of a non-conjugated, highly-unsaturated oil there is little or no effect upon the saturated fatty acid ester content, whether selective or non-selective conditions are employed. This unexpected phenomenon in part explains the peculiar effectiveness of the two-stage method of hydrogenation according to the present invention. Although neither type of hydrogenation results in any substantial increase in the saturated fatty acid ester content of the glyceridic oil during the initial stage, the non-selective method has been found to be particularly advantageous in the initial phases of hydrogenation in that a considerable portion of the polyunsaturated fatty acid esters are partially hydrogenated without any substantial degree of isomerization to the higher melting trans-configurations and without shifting of double bonds to the higher melting positional and conjugated polyunsaturated fatty acid ester forms. Thus the two-stage hydrogenation process of the present invention, employing first non-selective hydrogenation followed by selective hydrogenation, produces a more uniform product which is substantially devoid of certain high melting components.

Figures 1 and 2 of the appended drawings illustrate the equivalence of selective and non-selective types of hydrogenation in regard to the proportions of saturated and unsaturated esters formed in the hydrogenation of soya oil. Both non-selective and selective conditions result in a substantial degree of conversion of polyunsaturated esters to less saturated esters without appreciably increasing the content of saturated esters. However, the two partially hydrogenated oils are markedly different in regard to their conjugated ester and trans-ester contents as is described in my U. S. Patent No. 2,627,467, granted February 3, 1953. As has been stated hereinabove, and as will be shown by Tables I and II below, selective hydrogenation produces significantly greater concentrations of conjugated fatty acid ester forms than does non-selective hydrogenation. Table I sets forth the concentrations of conjugated linoleic and linolenic acids in the glycerides of soya oil hydrogenated under selective conditions at a pressure of 25 pounds per square inch (p. s. i. g.) and temperature of 350° F. for the progressively reduced iodine values as shown in Figure 1. These determinations were made at the same points (iodine values) as the other values shown in Figure 1. Table II is the counterpart of Table I except that the non-selective conditions of hydrogenation employed in Figure 2 were used, namely, 45 pounds per square inch and 225° F.

TABLE I

*Conjugated acid concentrations of selectively hydrogenated soya oil (pressure of 25 p. s. i. g. and temperature of 350° F.) (corresponds to Fig. 1)*

| Sample No. | Iodine value | Percent conjugated linoleic acid | Percent conjugated linolenic acid |
|---|---|---|---|
| Starting soya oil | 135.2 | None | 0.009 |
| 1 | 123.5 | 1.88 | 0.029 |
| 2 | 113.3 | | |
| 3 | 108.0 | 2.76 | 0.025 |
| 4 | 104.4 | | |
| 5 | 101.4 | 5.83 | 0.133 |

TABLE II

*Conjugated unsaturated acid concentrations of non-selectively hydrogenated soya oil (pressure of 45 p. s. i. g. and temperature of 225° F.) (corresponds to Fig. 2)*

| Sample No. | Iodine value | Percent conjugated linoleic acid | Percent conjugated linolenic acid |
|---|---|---|---|
| Starting Soya Oil | 135.2 | None | 0.009 |
| 1 | 125.1 | None | 0.001 |
| 2 | 115.1 | None | 0.0003 |
| 3 | 109.7 | None | 0.0005 |
| 4 | 108.1 | | |
| 5 | 104.9 | None | 0.009 |

As Table II demonstrates, non-selective hydrogenation conditions do not produce any substantial amounts of conjugated unsaturated acid esters whereas, as shown by Table I, significant concentrations of conjugated unsaturated acid esters are produced by selective hydrogenation.

The present invention enables one to take advantage of partially hydrogenated glyceridic oil produced under non-selective conditions, such as that of Figure 2 and Table II, which provide those lower melting glyceride components which will favorably influence the plasticity of the margarine oil even after it has been further hydrogenated under selective conditions.

The second stage of hydrogenation is carried out under selective conditions and results in reducing and even entirely eliminating the residual polyunsaturated ester content of the finished oil without forming objectionable amounts of normally solid unsaturated esters or solid saturated esters. The finished fat has been found to differ from all other so-called "plastic" margarines in its high oleic acid content, its low linoleic ester content and its relatively low saturated fatty acid ester content.

In order more clearly to disclose the nature of the present invention, specific examples illustrating the practice of the invention will hereinafter be described. It should be understood, however, that this is done solely by way of example and is intended neither to delineate the scope of the invention nor limit the ambit of the appended claims.

EXAMPLE 1

About 21,000 pounds of soya oil, having an iodine value of 138, was hydrogenated (non-selectively) at 50 pounds per square inch pressure and 230° F. using a commercial nickel catalyst (0.1%) during 90 minutes time and until the iodine value had been reduced to 115 I. V. (Wijs). At this point, heating steam was turned on and the hydrogen pressure was reduced to 15 pounds while the temperature was raised to 280° F. (selective hydrogenation). From this point the hydrogenation was continued at an accelerated rate under 25 pounds pressure and up to 350° F. for about ½ hour and until the iodine value was decreased to 75.5. After filtering and deodorizing, the fat had a Wiley melting point of 99.7° F. and a setting point of 76.8° F. The fatty acid composition of this hydrogenated margarine fat is compared with commercial margarine fats of the both brittle and plastic types in Table III which follows:

TABLE III

| | Percent acids | | | Satd. | I. V. | M. P., °F. |
|---|---|---|---|---|---|---|
| | Lino-lenic | Lino-leic | Oleic | | | |
| Fat of Example 1 | 0.0 | 2.2 | 79.5 | 13.9 | 75.5 | 99.7 |
| A brittle, all-soya commercial margarine fat | 0.0 | 2.6 | 79.4 | 13.6 | 79.4 | 93.7 |
| A plastic, all-soya commercial margarine fat of the blended fat type | 0.0 | 12.5 | 63.0 | 20.0 | 75.3 | 95.0 |

The hydrogenated fat produced by this example possesses the advantage of low linoleic ester content and excellent resistance to oxidative deterioration, as well as plasticity, whereas the brittle and the plastic margarine fats do not possess both desirable properties.

The oil of this example was used to prepare margarine by first dissolving the usual oil-soluble ingredients in the margarine oil and then mixing with the other ingredients and chilling the mixture by means of a commercial unit designed for this purpose in accordance with the following procedure:

About 1,250 pounds of the margarine oil was treated with 2 pounds of 94% pure glyceryl monostearate, 4 pounds of lecithin and appropriate minute quantities of vitamin A concentrate sufficient to provide a concentration of 9,000 units per pound of margarine and commercial carotene sufficient to provide a concentration of 7,000 units per pound of margarine. This mixture was continuously mixed by proportioning devices with 255 pounds of freshly pasteurized milk containing 45 pounds of salt and the resulting emulsion was then continuously chilled and worked by passing through a chamber equipped with refrigeration means and an agitator in accordance with the usual practices of the art. The solidified and homogenized margarine was immediately printed and cartoned in the usual manner. After storage at 45° F. the margarine exhibited an improved degree of spreadability at 45° F. and a marked increase in resistance to sagging and oiling-off at 80° F. as compared with a margarine made from oil hydrogenated solely under moderately selective conditions.

EXAMPLE 2

The procedure of Example 1 was repeated except that the point of change-over for non-selective conditions to selective conditions was at an iodine value of 105.6, instead of 115, and the non-selective hydrogenation was conducted at 230°–245° F. and 45 pounds per square inch pressure for 30 minutes, whereupon the pressure was reduced to 5–8 pounds during which time the temperature was raised to 285° F. at 285° F. the hydrogen pressure was increased to 20 pounds and the selective hydrogenation was rapidly completed to an iodine value of 75.4. The Wiley melting point was found to be 98.5° F. and the setting point was 76.1° F.

The margarine fat thus produced was compared with one of the brittle or low plasticity, all-soya margarines and with one of the blended-fat, plastic-type margarines in regard to the proportions of solids present at varying temperatures. For this determination a dilatometer was used which permitted an estimation of the percent solid fat present at the several temperatures. (See Melting and Solidification of Fats, A. E. Bailey, 1950, Interscience Publ.) The results are recorded in Table IV below:

TABLE IV

| | Percent solids | | | |
|---|---|---|---|---|
| | 50° F. | 70° F. | 80° F. | 92° F. |
| Plastic margarine fat of Example 2— M. P. 98.5; I. V. 75.4 | 27.5 | 15.4 | 11.0 | 4.1 |
| A brittle, non-plastic all-soya margarine fat—M. P. 97.2; I. V. 74.2 | 37.0 | 22.7 | 15.9 | 5.0 |
| A plastic blended type margarine fat—M. P. 95.0; I. V. 80.0 | 28.3 | 17.7 | 12.8 | 4.1 |

The outstanding properties of the margarine fats produced by Examples 1 and 2 were evidenced by good plasticity at 45° F., excellent stability (absence of slumping) in the cube test at 80° F. and absence of objectionable mouthing qualities. In contrast, while the non-plastic margarine fat melted well in the mouth and did not seriously slump in the 80° F. cube test, it was very brittle and crumbly at 45° F. The blended-fat, plastic margarine-fat had a good degree of spreadability at 45° F. However, it was objectionably slow-melting in the mouth and, as margarine, exhibited an objectionable degree of oiliness and staining of the carton at 80° F.

In the preparation of fats for use in margarine, the conversion from non-selective conditions to selective conditions is begun when the iodine value has been reduced to between 100 and 125, and preferably between 105 and 115 in the case of soya oil. The same ranges are satisfactory for sunflower oil, whereas for safflower oil and linseed oils the iodine value ranges for the point of change-over from non-selective to selective conditions may advantageously be about 10 to 20 iodine values lower, i. e., between 80 and 105 and preferably between 85 and 100. On the other hand, the change-over point for corn oil would be slightly higher as would that for cotton-seed oil. The most important improvement in the body characteristics of margarine fats from a commercial standpoint is that made possible by the application of the present invention to soya oil.

In most cases, where the hydrogenated fat is to be employed in making margarine, the hydrogenation should not exceed a point which produces a melting point substantially in excess of 100° F.

The present invention may also be advantageously employed in the preparation of fats for shortenings. For this purpose the change-over points for converting from non-selective conditions to selective conditions is preferably about 10 iodine values lower than the ranges given above for margarine fat hydrogenations. The shortening fat products obtained by practicing the present invention are distinguished by the absence of polyunsaturated esters, and hence provide good resistance to oxidative deterioration, a high degree of a permanently wide plasticity range, absence of progressive acquisition, upon storage, of "crackle" or brittle characteristics, good resistance to oiling-off at summer temperatures and excellent creaming properties.

When the two-stage hydrogenation method of the present invention is used for shortening-fat manufacture, it is sometimes desirable to stop the hydrogenation when a melting point of about 105° F. has been reached. A final adjustment to the desired melting point may be made by the addition of a few percent of a hard fat. In the case of a shortening to be used for making cakes having more sugar than flour, the final adjustment of melting point may also be achieved by the effect of the necessarily added emulsifiers if these are of relatively high melting point.

There are several conditions which have a bearing upon whether the hydrogenation shall be non-selective or selective in character, and those skilled in the art are familiar with them. In general, it may be said that the higher the pressure conditions, the lower the temperature and the less active the catalyst, the more non-selective the character of the hydrogenation is likely to be. While each of these factors, as well as others with which those skilled in the art are familiar, play a part in determining the character of the hydrogenation, the condition which plays the role of primary importance in controlling the type or character of the hydrogenation, is temperature. The other conditions, such as pressure and catalyst activity, are of much lesser importance. I have observed that, generally speaking, a temperature of 260° F. may be said to be the dividing point between selective and non-selective conditions. More specifically, at hydrogenation temperatures below 250° F. the hydrogenation is likely to be non-selective in character while at temperatures above 260° F. the hydrogenation is likely to be selective. Naturally, the lower the temperature, the more non-selective will be the hydrogenation; while the higher the temperature, the more selective it will be.

Hydrogenation catalysts of the various types known to the art may be employed at either stage of the process.

Mixtures of glyceridic or vegetable oils may be employed in the process of the invention as well as single oils. Preferably, the iodine value of the starting oil or oil mixture should be 120 or above.

The setting points disclosed herein were determined by the method described in U. S. Patent No. 2,047,530 of H. W. Vahlteich et al. The melting points were determined by the Wiley method. The iodine values have been designated as "I. V." in some cases and were determined according to the method of Wijs.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. In the process of hydrogenating a non-conjugated unsaturated glyceridic oil to produce a margarine fat without forming significant quantities of isomers of the fatty acid glycerides and conjugated polyunsaturated fatty acid glycerides, the novel steps which comprise initially hydrogenating the glyceridic oil under non-selective conditions until an iodine value of 100 to 125 is reached and subsequently hydrogenating the resulting partially hydrogenated oil under selective conditions.

2. A process for hydrogenating a soya oil to produce a margarine fat without forming significant quantities of isomers of fatty acid glycerides and conjugated polyunsaturated fatty acid glycerides which comprises hydrogenating said oil under non-selective conditions at a temperature of about 230 to below about 250° F. until an iodine value of 105 to 115 is reached and then hydrogenating the partially hydrogenated oil under selective conditions at a temperature above about 260° F. and up to about 350° F. to produce the margarine fat.

3. A process for hydrogenating a non-conjugated unsaturated glyceridic oil to produce a margarine fat without forming significant quantities of isomers of fatty acid glycerides and conjugated polyunsaturated fatty acid glycerides which comprises hydrogenating said oil under non-selective conditions at a temperature of about 230° to below about 250° F. until an iodine value of 100 to 125 is reached and then hydrogenating the partially hydrogenated oil under selective conditions at a temperature above about 260° and up to about 350° F. to produce the margarine fat.

4. A margarine fat having no significant quantities of isomers of the fatty acid glycerides and conjugated polyunsaturated fatty acid glycerides, excellent plasticity at normal refrigeration temperatures and which is not subject to becoming unduly soft at summer temperatures, said fat being produced by initially hydrogenating a non-conjugated unsaturated glyceridic oil under non-selective conditions at a temperature below 250° F. until an iodine value of 100 to 125 is reached and subsequently hydrogenating the resulting partially hydrogenated oil under selective conditions at a temperature above 260° F.

5. A margarine fat having excellent plasticity at normal refrigeration temperatures without becoming unduly soft at summer temperatures which is prepared in accordance with the method of claim 3.

References Cited in the file of this patent
UNITED STATES PATENTS

| | | |
|---|---|---|
| 2,047,530 | Vahlteich et al. | July 14, 1936 |
| 2,163,603 | Jenness | June 27, 1939 |

OTHER REFERENCES

Industrial Oil and Fat Products, by A. E. Bailey, copyright 1945 (1st edition), pages 615 and 616.

UNITED STATES PATENT OFFICE
CERTIFICATE OF CORRECTION

Patent No. 2,814,633

Chester M. Gooding

November 26, 1957

It is hereby certified that error appears in the above numbered patent requiring correction and that the said Letters Patent should read as corrected below.

In the drawings, Fig. 2, for

Pressure:     25 PSIG
read          Temperature:  350° F.

Pressure:     45 PSIG
                Temperature:  225° F.

Signed and sealed this 8th day of April 1958.

(SEAL)
Attest:

KARL H. AXLINE
Attesting Officer

ROBERT C. WATSON
Commissioner of Patents